United States Patent
Agarwal et al.

(10) Patent No.: US 10,852,146 B2
(45) Date of Patent: Dec. 1, 2020

(54) LOCALIZATION TECHNIQUE SELECTION

(71) Applicant: Ford Global Technologies, LLC, Dearborn, MI (US)

(72) Inventors: Siddharth Agarwal, Dearborn, MI (US); Ankit Girish Vora, Dearborn, MI (US); Jakob Nikolaus Hoellerbauer, Canton, MI (US); Peng-yu Chen, Ferndale, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 366 days.

(21) Appl. No.: 15/907,623

(22) Filed: Feb. 28, 2018

(65) Prior Publication Data

US 2019/0265046 A1 Aug. 29, 2019

(51) Int. Cl.
*G01C 21/30* (2006.01)
*G01S 17/931* (2020.01)
*G01S 7/48* (2006.01)

(52) U.S. Cl.
CPC ............ *G01C 21/30* (2013.01); *G01S 7/4802* (2013.01); *G01S 17/931* (2020.01)

(58) Field of Classification Search
CPC ...... G01S 17/931; G01S 7/4802; G01C 21/30
See application file for complete search history.

(56) References Cited

U.S. PATENT DOCUMENTS

| | | | |
|---|---|---|---|
| 8,612,135 B1 | 12/2013 | Montemerlo et al. | |
| 8,798,840 B2 | 8/2014 | Fong et al. | |
| 9,037,403 B2 | 5/2015 | Delp | |
| 9,599,480 B2 * | 3/2017 | Felemban | G08G 1/096741 |
| 9,707,961 B1 | 7/2017 | Halder et al. | |
| 9,734,455 B2 * | 8/2017 | Levinson | G06N 7/005 |
| 2007/0018890 A1 | 1/2007 | Kulyukin | |
| 2018/0216942 A1 * | 8/2018 | Wang | G01S 17/89 |

FOREIGN PATENT DOCUMENTS

DE 102015218810 A1 3/2017

OTHER PUBLICATIONS

Google search: Intensity mapping_grip mapping (Year: NA).*

* cited by examiner

*Primary Examiner* — Jeff A Burke
*Assistant Examiner* — Jamal A Shah
(74) *Attorney, Agent, or Firm* — Frank A. MacKenzie; Bejin Bieneman PLC (57) ABSTRACT

A system includes a processor and a memory. The memory stores instructions executable by the processor to select a technique, from a plurality of techniques, to identify a vehicle location by sensor and map data based on features detected in sensor data of an area in which the vehicle is located, to determine a location of the vehicle based on the selected technique; and to navigate the vehicle based at least in part on the identified location.

17 Claims, 7 Drawing Sheets

LOCALIZATION TECHNIQUE SELECTION

BACKGROUND

A vehicle such as an autonomous or semi-autonomous vehicle can use data from a LIDAR (Light Imaging Detection And Ranging) sensor to aid navigation. LIDAR sensors can be used to generate point cloud data, i.e., a collection of data describing points in three dimensions. Further, an autonomous vehicle may compare its substantially real-time LIDAR point-cloud data to a map of an area in which the vehicle is operating for locating the vehicle within the area and navigating the vehicle based on the determined vehicle location. There are various techniques available to locate the vehicle based on the map data. It is a problem to select the technique that is likely to provide for most effective and/or efficient operation of the vehicle.

DETAILED DESCRIPTION

Introduction

Disclosed herein is a system including a processor and a memory. The memory stores instructions executable by the processor to select a technique, from a plurality of techniques, to identify a vehicle location by sensor and map data based on features detected in sensor data of an area in which the vehicle is located, to determine a location of the vehicle based on the selected technique, and to navigate the vehicle based at least in part on the identified location.

The instructions may include further instructions to determine, for each technique, a ratio of a number of detected features in the area for the respective technique to a number of available features in the map of the area for the respective techniques.

The instructions may include further instructions to select the technique with a highest ratio.

The available features may include detectable edges on a ground surface including a road boundary, a shape, a gradient, a pattern, a building, a bridge, a traffic light, a delineator, and a raised pavement marker.

The instructions may include further instructions to detect the features based on received data from at least one of a vehicle LIDAR sensor and a vehicle camera sensor.

The plurality of techniques may include an intensity mapping and an occupancy grid mapping.

The instructions may include further instructions to receive data from at least one of a vehicle LIDAR sensor and a vehicle camera sensor, to receive map data according to the selected technique, and to determine the location of the vehicle based on the received map and the received data.

The instructions may include further instructions to determine a first ratio of a first number of available points in a first map based on a first technique divided by a first minimum number of points for detecting the location based on the first map, and to determine a second ratio of a second number of available points in a second map based on a second technique divided by a second minimum number of points for detecting the location based on the second map, to select the first technique upon determining that the first ratio is greater than the second ratio, and to determine the location of the vehicle based on the first map and data received from a vehicle sensor.

Each of the techniques may include determining the location of the vehicle based on data received from a vehicle sensor and a map of the area.

Further disclosed herein is a method including selecting a technique, from a plurality of techniques, to identify a vehicle location by sensor and map data based on features detected in sensor data of an area in which the vehicle is located, determining a location of the vehicle based on the selected technique, and navigating the vehicle based at least in part on the identified location.

The method may further include determining, for each technique, a ratio of a number of detected features in the area for the respective technique to a number of available features in the map of the area for the respective techniques.

The method may further include selecting the technique with a highest ratio.

The available features may include detectable edges on a ground surface including a road boundary, a shape, a gradient, a pattern, a building, a bridge, a traffic light, a delineator, and a raised pavement marker.

The method may further include detecting the features based on received data from at least one of a vehicle LIDAR sensor and a vehicle camera sensor.

The plurality of techniques may include an intensity mapping and an occupancy grid mapping.

The method may further include receiving data from at least one of a vehicle LIDAR sensor and a vehicle camera sensor, receiving map data according to the selected technique, and determining the location of the vehicle based on the received map and the received data.

The method may further include determining a first ratio of a first number of available points in a first map based on a first technique divided by a first minimum number of points for detecting the location based on the first map, and determining a second ratio of a second number of available points in a second map based on a second technique divided by a second minimum number of points for detecting the location based on the second map, selecting the first technique upon determining that the first ratio is greater than the second ratio, and determining the location of the vehicle based on the first map and data received from a vehicle sensor.

A technique may include determining the location of the vehicle based on data received from a vehicle sensor and a map of the area.

Further disclosed is a system including means for selecting a technique, from a plurality of techniques, to identify a vehicle location by sensor and map data based on features detected in sensor data of an area in which the vehicle is located, means for determining a location of the vehicle based on the selected technique, and means for navigating the vehicle based at least in part on the identified location.

The system may further include means for determining a first ratio of a first number of available points in a first map based on a first technique divided by a first minimum number of points for detecting the location based on the first map, and means for determining a second ratio of a second number of available points in a second map based on a second technique divided by a second minimum number of points for detecting the location based on the second map, means for selecting the first localization technique upon determining that the first ratio is greater than the second ratio, and means for determining the location of the vehicle based on the first map and data received from a vehicle sensor.

Further disclosed is a computing device programmed to execute any of the above method steps.

Yet further disclosed is a computer program product, comprising a computer readable medium storing instructions executable by a computer processor, to execute any of the above method steps.

System Elements

Navigation of a land vehicle may be based on three-dimensional (3D) map data of an area in which the vehicle is operating. A vehicle computer may select one of multiple types of maps to determine a vehicle location in an area. A technique for determining the vehicle location is selected according to a type of the selected map. The vehicle 180 can be navigated within the area according to the determined location. The vehicle computer may select the map and the technique based on data received from vehicle sensor(s) and information available in the map at a current vehicle location. For example, depending on an overlap between a type of information the vehicle sensors provide at the current area of the vehicle and a type of information included in each of the maps for the current area, the computer selects a map to determine the vehicle location.

Figure 1:
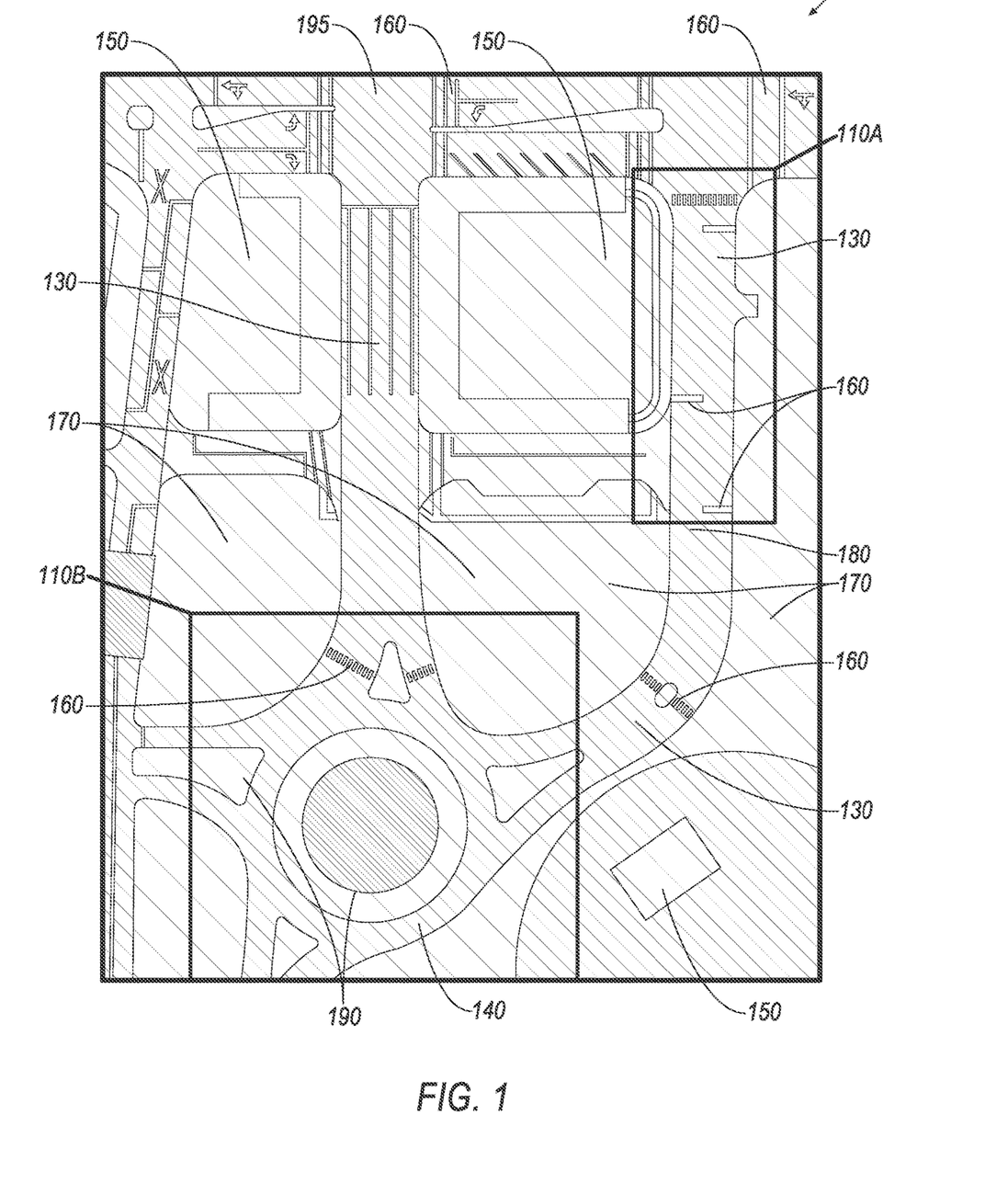
FIG. 1 is a block diagram of an exemplary area.

FIG. 1 illustrates a vehicle 180 driving in an example geographical area 100. FIG. 1 is a top view of the area 100, e.g., a representation of an image captured by a camera above the ground. To capture an aerial or top-view image of an area 100, a camera may be mounted to a satellite, aircraft, helicopter, unmanned aerial vehicles (or drones), balloon, stand-alone pole, etc. A geographic area 100 (or simply area 100) in the context of this disclosure means a two-dimensional area on the surface of the earth. Boundaries or edges of an area 100 may be defined by global positioning system (GPS) coordinates, e.g., as vertices of a triangular or rectangular area 100, a center of a circular area 100, etc. An area 100 may have any dimensions and/or shape, e.g., rectangular, oval, circular, non-geometrical shape, etc. For example, an area 100 may include a neighborhood, a town, an airport, etc.

An area 100 may include features, i.e., physical characteristics, such as road(s) 130, roundabout(s) 140, building(s) 150, road markings 160, tree or other structures 170, and intersection(s) 195. A road 130 can be any type of dirt road 130 or paved road 130, e.g., covered by concrete, asphalt, tar, etc. A road 130 may have one or more lanes. A road 130 may be one-way or two-way. A roundabout 140 may have a circular or oval shape. An intersection 195 may be a location where two or more roads intersect. A road marker 160 may be a raised and/or flush pavement marker formed of metal, plastic, etc., that is mounted to and/or embedded in a road 130 surface, and/or a painted marking on the road 130 surface. A boundary (or edge) of a road 130 is where a road 130 surface material, e.g., asphalt, ends. In the present context, the boundary 190 may additionally or alternatively include one or more physical roadway features such as a traffic barrier including metal guardrail boundaries 190, one or more road marker 160 such as a painted line or lines, etc. An area 100 may include any type of structures 170 such as traffic sign(s), bridge(s), etc. and/or vegetation(s), hill(s), mountain(s), etc.

FIG. 1 shows example zones 110A, 110B. A zone 110A, 110B refers to a portion of geographical area 100 associated with current location of the vehicle 180, e.g., a rectangular shaped area centered at the vehicle 180 location. Thus, a zone 110A, 110B moves as the vehicle 180 moves. The zones 110A, 110B may have fixed dimensions, e.g., 100× 100 meter, and a rectangular, circular, and/or an irregular shape, etc. Thus, FIG. 1 shows two example zones 110A, 110B which illustrates the boundaries of zones 110A, 110B based on two different locations of the vehicle 180 within the area 100. Respective zones 110A, 110B dimensions or boundaries may be defined based on a field of view of vehicle 180 sensors 230, as discussed below with reference to FIGS. 5-6. In the present context, an area 100 may be a neighborhood, etc., whereas a zone 110A, 110B is a portion of the area 100 surrounding the vehicle 180 and substantially within a field of view of the vehicle 180 sensors 230, as discussed with reference to FIGS. 5-6.

Figure 2:
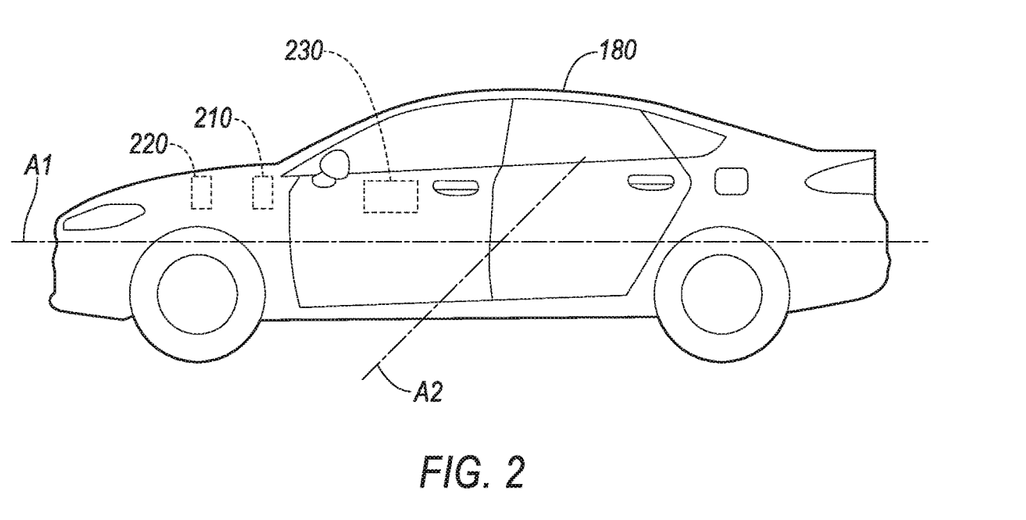
FIG. 2 shows an example vehicle.

Referring now to FIG. 2, an example vehicle 180 includes a computer 210, actuator(s) 220, sensors 230 such as a (Light Detection and Ranging) LIDAR sensor 230, GPS sensor 230, etc., and other components such as discussed herein below. A vehicle 180 may be powered in variety of ways, e.g., including with an electric motor and/or internal combustion engine.

The computer 210 includes a processor and a memory. The memory includes one or more forms of computer-readable media, and stores instructions executable by the computer 210 for performing various operations, including as disclosed herein.

The computer 210 may operate the vehicle 180 in an autonomous, semi-autonomous, or non-autonomous mode. For purposes of this disclosure, an autonomous mode is defined as one in which each of vehicle 180 propulsion, braking, and steering are controlled by the computer 210; in a semi-autonomous mode the computer 210 controls one or two of vehicle 180 propulsion, braking, and steering; in a non-autonomous mode, a human operator controls vehicle propulsion, braking, and steering.

The computer 210 may include programming to operate one or more of vehicle brakes, propulsion (e.g., control of acceleration in the vehicle 180 by controlling one or more of an internal combustion engine, electric motor, hybrid engine, etc.), steering, climate control, interior and/or exterior lights, etc., as well as to determine whether and when the computer 210, as opposed to a human operator, is to control such operations.

The computer 210 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 210 is generally arranged for communications on a vehicle communication network such as a bus in the vehicle such as a controller area network (CAN) or the like.

Via the vehicle network, the computer 210 may transmit messages to various devices in the vehicle 180 and/or receive messages from the various devices, e.g., the LIDAR sensor 230, actuators 220, etc. Alternatively or additionally, in cases where the computer 210 actually comprises multiple devices, the vehicle communication network may be used for communications between devices represented as the computer 210 in this disclosure. Further, as mentioned below, various controllers and/or sensors 230 may provide data to the computer 210 via the vehicle 180 communication network.

The vehicle 180 actuators 220 may be implemented via circuits, chips, or other electronic components that can actuate various vehicle subsystems in accordance with appropriate control signals as is known. The actuators 220 may be used to control braking, acceleration, and steering of the first vehicle 180. As an example, the vehicle 180 computer 210 may output control instructions to control the actuators 220.

The vehicle 180 may include one or more LIDAR sensor(s) 130, providing data encompassing at least some of an exterior of the vehicle 180. The LIDAR sensor 230 may include a processor that is programmed to transmit LIDAR data via the vehicle 180 network. The LIDAR data may be received by the vehicle 180 computer 210 from LIDAR sensors 230 in a known manner, e.g., via a vehicle 180 network whereby the LIDAR data can be stored in a memory of the computer 210. The LIDAR data may include coordinates, e.g., in a 3-dimensional cartesian coordinate system. LIDAR data may further include other data pertaining to other objects such as size, relative speed to the host vehicle 180, etc. In one example shown in FIG. 2, a LIDAR sensor 230 may sweep an area 100 in the LIDAR sensor 230 field of view, e.g., an area 100 around the vehicle 180, by transmitting LIDAR beams, e.g., laser beams, and receive reflections of the transmitted LIDAR beams. The LIDAR sensor 230 sweeps an area around the vehicle 180 with light beams and receives reflections of the broadcasted light beams from outer surfaces of the features such as structures 170, etc., and/or road 130 surface. Thus, the LIDAR data may include location coordinates of points on outer surfaces of features which cause a reflection of the emitted light beams. In other words, the LIDAR sensor 230 data may include 3D location coordinates of a plurality of points within the field of view of the LIDAR sensor 230.

In addition, the computer 210 may be programmed to communicate through a wireless communication network with, e.g., a remote computer. The wireless communication network, which may include a Vehicle-to-Vehicle (V-to-V) and/or a Vehicle-to-Infrastructure (V-to-I) communication network, includes one or more structures by which the vehicles 180, the remote computer, etc., may communicate with one another, including any desired combination of wireless (e.g., cellular, wireless, satellite, microwave and radio frequency) communication mechanisms and any desired network topology (or topologies when a plurality of communication mechanisms are utilized). Exemplary V-to-V or V-to-I communication networks include cellular, Bluetooth, IEEE 802.11, dedicated short range communications (DSRC), and/or wide area networks (WAN), including the Internet, providing data communication services.

Figure 3:
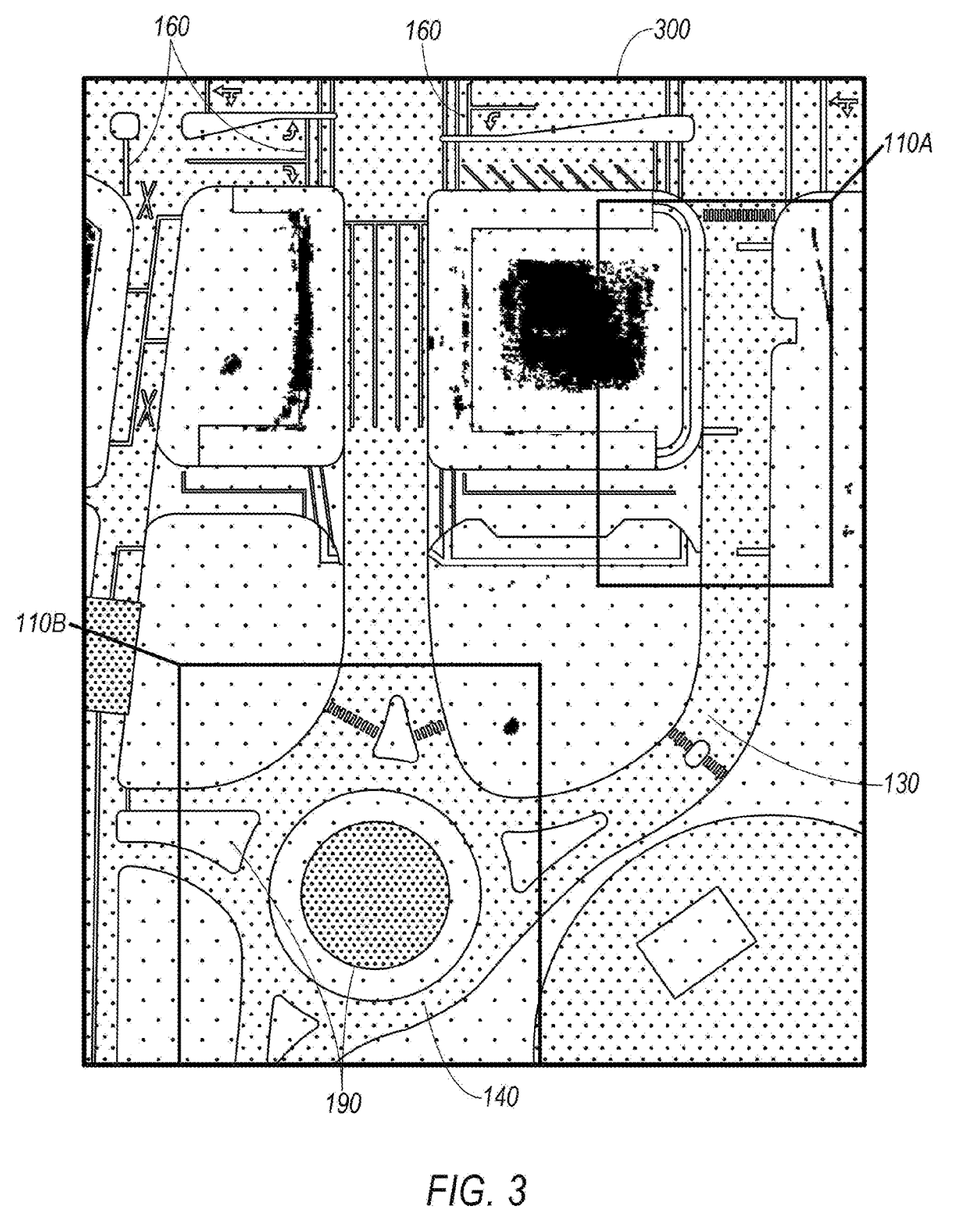
FIG. 3 is shows an intensity map of the area of FIG. 1.
Figure 4:
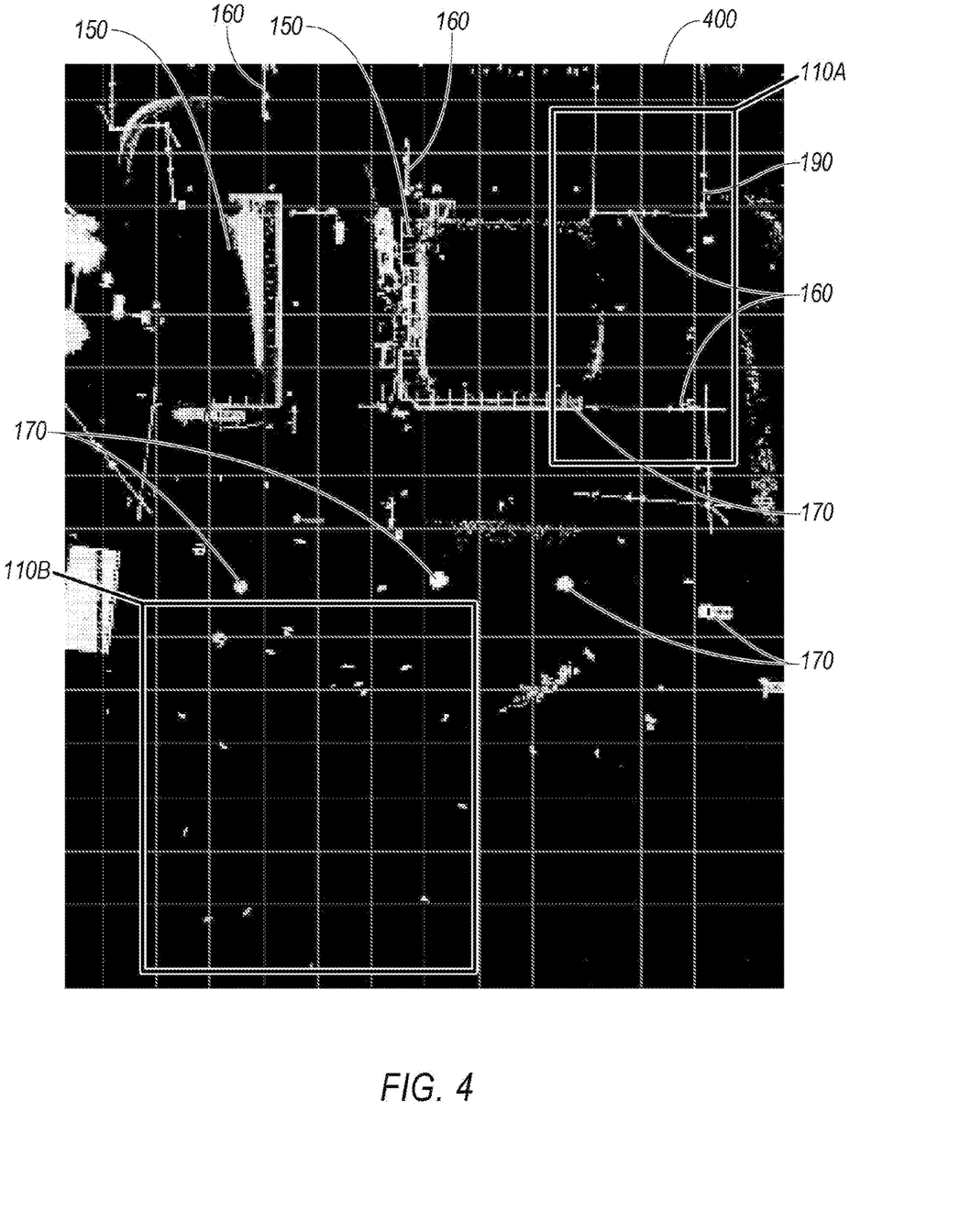
FIG. 4 is shows an occupancy grid map of the area of FIG. 1.

Vehicle 180 navigation may be based on map data of an area 100 in which the vehicle 180 is operating. A vehicle 180 computer 210 may use a map of the area 100 to determine a vehicle 180 location and/or to navigate the vehicle 180 within the area 100. FIGS. 3-4 illustrate two different types of map for the example area 100 of FIG. 1. As discussed below, different types of maps of an area 100 may be generated, and the computer 210 may be programmed to determine the vehicle 180 location using one of multiple techniques that is in accordance with the type of the map of the area 100 selected for localizing the vehicle 180. As discussed below, the computer 210 may be programmed to use different computational techniques based on a type of map selected for locating the vehicle 180.

An intensity map 300, as shown in FIG. 3, is a map representing an area 100 in a two-dimensional (2D) plane. The intensity map 300 includes multiple cells, e.g., forming a grid of same size cells, and includes an average intensity for each cell of the map. A cell of the intensity map 300 represents a portion of the ground surface. In one example, dimensions of cells may be associated with a 10×10 centimeter (cm) square on the ground surface. An "intensity" of a cell may be specified by a numeric value, e.g., in percentage, representing a physical measurement of a brightness of an area encompassed by the respective cell. In one example, an intensity of 0 (zero) % specifies a dark point and an intensity of 100% is a bright cell on the intensity map 300. Additionally, an intensity map 300 may include a standard deviation value for each cell of the map. The computer 210 may be programmed to identify features based on the intensity value and/or standard deviation of cells.

An occupancy map 400, as shown in FIG. 4, is a map representing an area 100 in a 2D plane. The intensity map 300 includes multiple cells, e.g., in form of a grid of same size cells, and each cell is associated with a probability of being occupied. "Occupied," in the present context means that a volume above an area 100 cell on the ground surface is occupied by a physical object, e.g., a building 150, a structure or tree 170, a guardrail boundary 190, a raised pavement marker 160, etc.

As discussed above, the computer 210 may be programmed to determine the location of the vehicle 180 based on data received from the vehicle 180 sensor(s) 130, e.g., the LIDAR sensor 230, and an area 100 map, using a localization technique. "Localization" of the vehicle 180, in the present context, means determining the location of the vehicle 180. The computer 210 may be programmed to localize the vehicle 180 based on different computational techniques and the received LIDAR sensor 230 data. As discussed above, there are different types of maps, e.g., an intensity map 300, an occupancy map 400, etc. The computer 210 may be programmed to localize the vehicle 180 using a technique in accordance with a type of map selected for localization. A "technique," i.e., localization technique, in the present context is at minimum a set of computer-executed steps to determine the location of the vehicle 180 based on features included in the selected map 300, 400 and the data received from the LIDAR sensor 230.

The computer 210 can be programmed to select a localization technique from a plurality of techniques to identify a vehicle 180 location by sensor 230 and map data based on features detected in sensor 230 data of an area 100 in which the vehicle 180 is located. The computer 210 can be further programmed to determine the location of the vehicle 180 based on the selected technique and to navigate the vehicle 180 based at least in part on the identified location.

In the present context, a "feature" includes physical characteristics, such as edges (e.g., a road boundary 190, a metal guard 190, etc.) on a ground surface, a shape (e.g., of a structure 170), a gradient (or slope), a pattern (e.g., of a roundabout), a building 150, a bridge, a traffic light, a delineator, and a raised pavement marker 160.

The computer 210 may be programed to receive data from a vehicle 180 sensor 230, e.g., a LIDAR sensor 230, a camera sensor 230, etc., to receive map data according to a selected technique, and to determine the location of the vehicle 180 based on the received map and the received data. A localization technique includes determining the location of the vehicle 180 based on data received from a vehicle 180 sensor 230 and a map of the area, e.g., an intensity map 300, an occupancy map 400, etc. An intensity map localization technique may localize the vehicle 180 based on received LIDAR sensor 230 data and an intensity map 300 of the area 100, whereas an occupancy map localization technique may localize the vehicle 180 based on the received LIDAR sensor 230 and an occupancy map 400 of the area 100. The computer 210 may be programmed to receive map data of the current zone according to the selected localization technique by (i) receiving intensity map 300 data upon selecting localization based on the intensity map 300 data, or (ii) receiving occupancy map 400 data upon selecting localization based on the occupancy map 400.

As discussed below with reference to FIGS. 3-6, each of the localization techniques may be based on different type of features to localize the vehicle 180. A technique typically localizes the vehicle 180 based on features that are typically detectable a respective type of map, e.g., a localization using intensity map 300 localizes the vehicle 180 based on those type of features that are typically found in an intensity map 300, e.g., round boundaries 190, shapes, gradients, etc.

Figure 5:
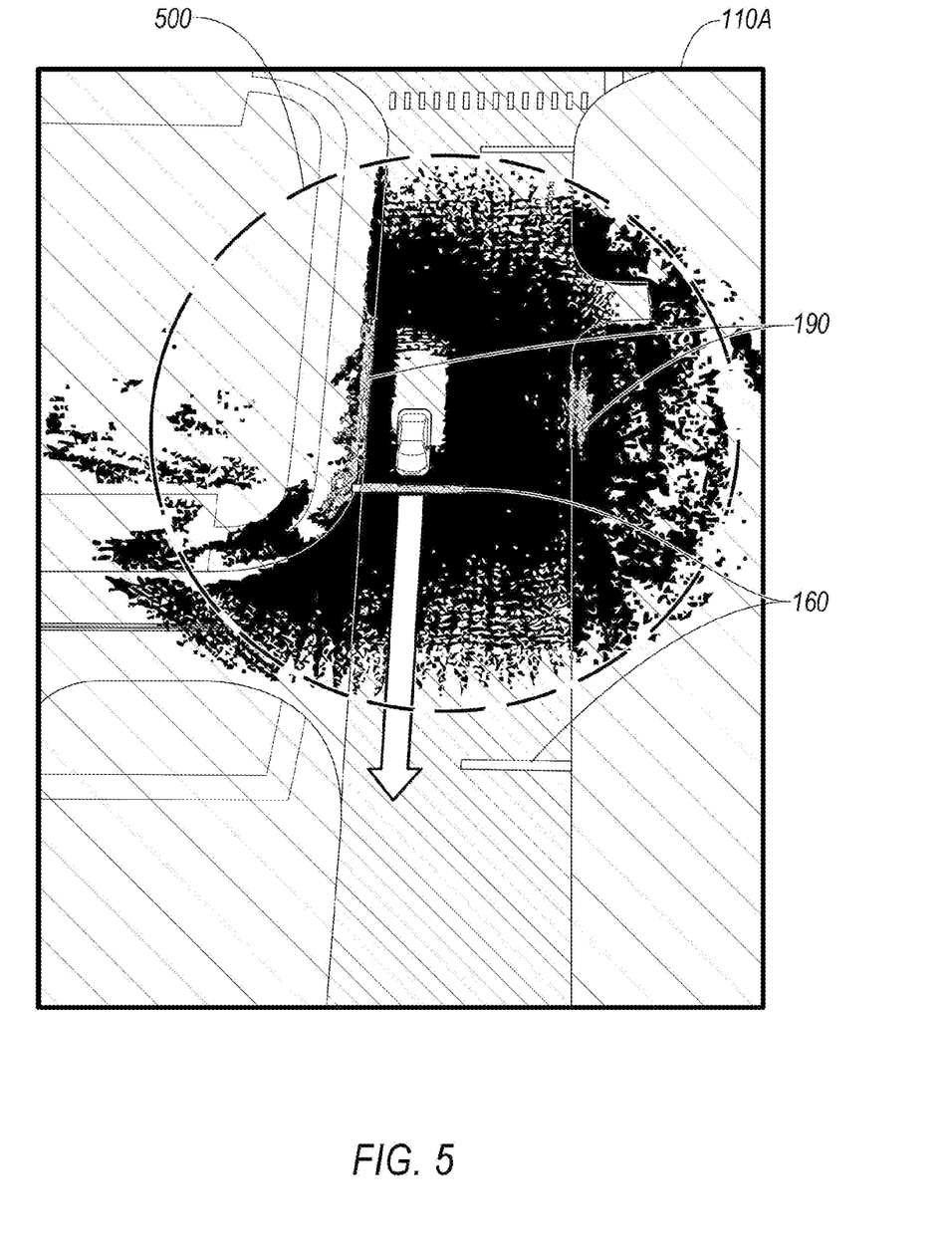
FIG. 5 shows the vehicle of FIG. 1 in a first zone of the area.
Figure 6:
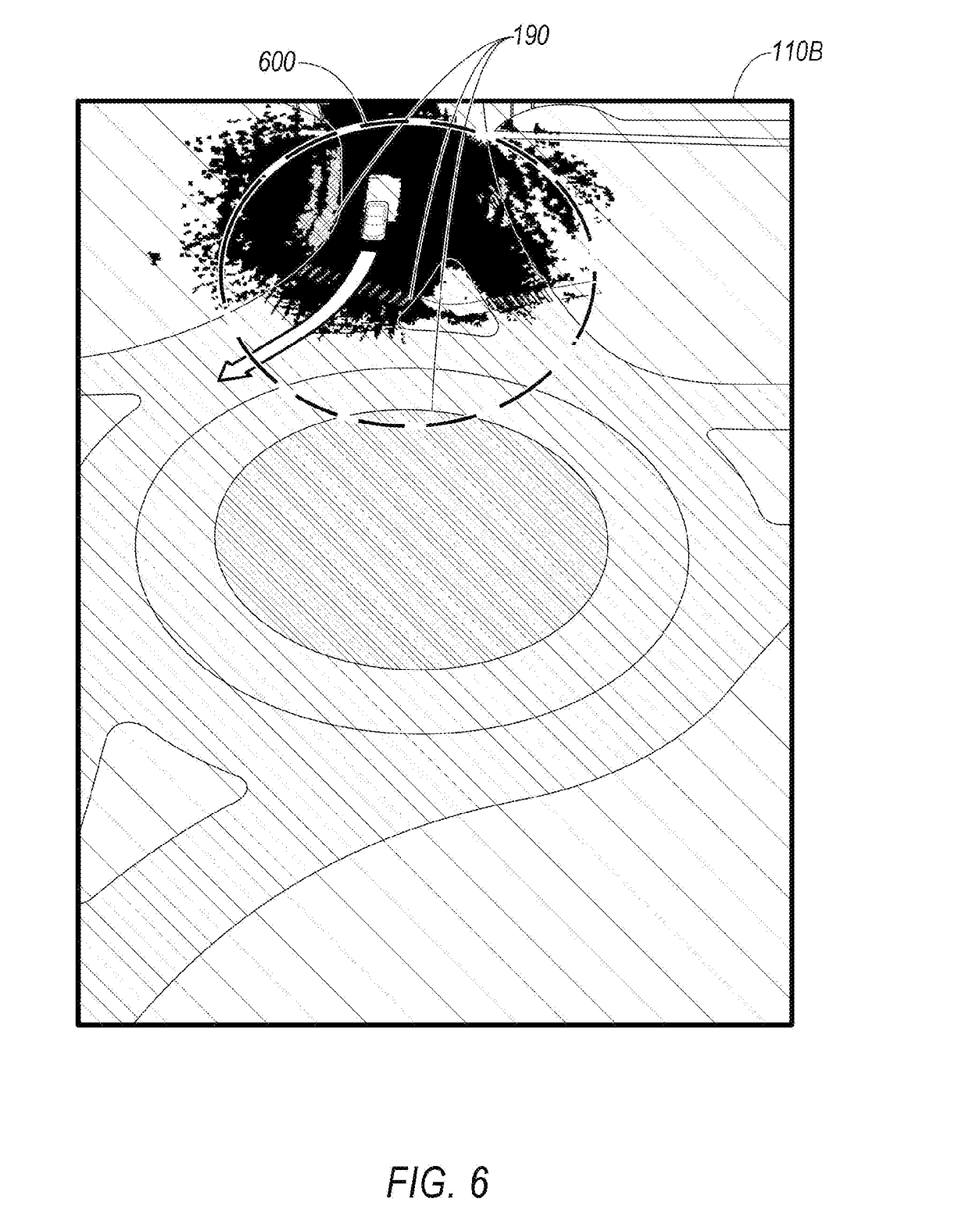
FIG. 6 shows the vehicle of FIG. 1 in a second zone of the area.

With reference to FIGS. 3-6, selection of a localization technique for two example zones 110A, 110B are discussed. FIGS. 5-6 illustrates example fields of view 500, 600 of the vehicle 180. For example, the vehicle 180 LIDAR sensor(s) 230 may have fields of views 500, 600, e.g., circular areas with a radius of 200 meters centered at the vehicle 180 location. FIG. 5-6, illustrate graphical representations of data received from the vehicle 180 LIDAR sensor 230 in each of the example fields of view 500, 600. In one example, the zones 110A, 110B dimensions may be defined based on a shape and/or dimensions of the fields of view 500, 600. For example, the vehicle 180 zone 110A, 110B may be substantially the same as or substantially overlapping the field of view 500, 600 of the vehicle 180. "Substantially same or overlapping," in the present context means at least 70% of the zone 110A, 110B is covered by the field of view 500, 600.

The computer 210 may be programmed to identify the features, e.g., the structures 170, road boundaries 190, patterns, etc., based on the received LIDAR sensor 230 data and the selected map 300, 400 data. The computer 210 may be programmed to detect features such as the road boundaries 190 (see FIG. 5), e.g., guardrails, and road markings 160, e.g., raised pavement markers. The computer 210 may be programmed to select an occupancy map 400 (see FIG. 4), based on determining that the features detected in the received LIDAR data are available in the occupancy map 400. In other words, the computer 210 may select the occupancy map 400 because the occupancy map 400 provides data for the features which can be also identified by the vehicle 180 sensors 130. In one example, the computer 210 may be programmed to select a map 300, 400 which has the most number of available features that are also detected in the received sensor 230 data. Various selection methods are discussed here below.

That a feature is "available" in the map means, in the present context, the map includes data such as location, dimensions, etc. pertaining to the feature. For example, the intensity map 300 may not include raised pavement marker 160 location. Thus, the raised pavement markers 160 features may be unavailable in the intensity map 300 data. In another example, the occupancy map 400 may not include gradient, pattern, etc., of features of a road 130 and road boundaries 190. The computer 210 determine available features in the map 300, 400 based on information indicating at least approximate location coordinates of the vehicle 180, e.g., based on GPS sensor 230 data, dead reckoning data, etc. In the present context, "approximate location" means location coordinates within an error range of up to 50 meters. Using dead reckoning, the computer 210 may be programmed to determine the vehicle 180 location coordinates based on recent determined vehicle 180 location coordinates and changes of vehicle 180 speed and direction since most recently determining a location of the vehicle 180. The computer 210 may be programmed to determine a feature in a map 300, 400 to be "available" upon detecting the feature based on the data included in the map 300, 400. For example, the computer 210 may determine a bridge structure 170 as an available feature upon detecting the bridge structure 170 in the received map 300, 400 data, e.g., using pattern recognition techniques. The computer 210 may detect the bridge structure 170 based on the received LIDAR sensor 230 data.

In another example, as shown in FIG. 6, the computer 210 may be programmed to detect a pattern, e.g., a curve of the road 130, by detecting road boundaries 190, e.g., based on gradient of intensity changes, and to identify the roundabout 140. A gradient of intensity changes, herein, may refer to, e.g., a change in brightness resulting from a slope of ground around and/or in a middle of the roundabout 140. With reference to FIGS. 3, 4, and 6, the computer 210 may be programmed to select the intensity map 300, because the features detected in the LIDAR sensor 230 data are available in the intensity map 300. The computer 210 may be further programmed to localize the vehicle 180 based on the received sensor 230 data and the intensity map 300.

Examples will now be discussed concerning how the computer 210 may select a map 300, 400 to localize the vehicle 180 within a zone 110A, 110B. As one example, the computer 210 may be programmed to determine, for each localization technique, a ratio of a number of detected features in the area 100 for the respective technique to a number of available features in the map of the area 100 for the respective techniques. The computer 210 may be programmed to determine a current zone 110A, 110B of the vehicle 180 based on, e.g., dead reckoning, GPS sensor 230 data, etc., and to determine a first and a second number $af_i$, $af_o$ of respective available features in the intensity map 300 and the occupancy map 400 within a current zone 110A, 110B. The computer 210 may be programmed to determine a third and fourth number $df_i$, $df_o$ of respective detected features in the current zone 110A, 110B which are available in a corresponding intensity and occupancy map 400. Thus, the computer determines a first and a second ratio $r_i t$, $r_o$ for the intensity and occupancy map techniques. The computer 210 may be programmed to select a technique with a highest ratio $r_i$, $r_o$.

$$r_i = \frac{dfi}{afi} \quad (1)$$

$$r_o = \frac{dfo}{afo} \quad (2)$$

In the present context, a number of features may correspond to a number of cells in the map including the feature and/or a number of cells in the received sensor 230 data including the feature. For example, with reference to FIG. 5, a raised pavement marker 160 may be divided into 40 cells in the map and/or received LIDAR sensor 230 data. The guardrail road marking 190 within the zone 110A may be included in the occupancy map 400 and may be divided into 500 cells. In other words, the occupancy map 400 includes 40 features associated with the raised pavement marker 160 and 500 features associated with the road marking 190. Thus, $af_o=40+500=540$ The received LIDAR sensor 230 data may include 30 occupied cells at raised pavement marker 160 and 400 occupied cells at guardrail road marking 190. With reference to the occupancy map 400, an "occupied" cell may be a cell with a likelihood of being occupied exceeding a likelihood threshold, e.g., 80%. The computer 210 may detect 30 features associated with the raised pavement marker 160 and 400 features associated with the road marking 190. Thus, $df_o=30+400=430$ The computer 210 may be programmed to determine the ratio $r_o$ as below:

$$r_o = \frac{dfo}{afo} = \frac{430}{540} = 0.8$$

The computer 210 may be programmed to select the occupancy map 400 upon determining that the ratio $r_o$ at the vehicle 180 location is greater than the ratio L.

Typically, the LIDAR sensor 230 data include three-dimensional location coordinates of points on surfaces, e.g., outer surface of a feature such as tree, bridge, raised pavement, road surface, etc., whereas the received intensity and occupancy map 400 data include two-dimensional data. In one example, the computer 210 may be programmed to generate intensity and/or occupancy representation of the current vehicle 180 zone 110A, 110B based on the received three-dimensional data from the LIDAR sensor 230, using known techniques. Additionally or alternatively, the computer 210 may be programmed to receive data from the LIDAR sensor 230 in form of two-dimensional intensity and/or occupancy maps 300, 400.

The ratio $r_i$ can be determined based on the intensity map 300 and the received LIDAR sensor 230 data. In the context of intensity map 300, an occupied cell is a cell with an intensity exceeding an intensity threshold, e.g., 80%. Additionally or alternatively, the computer 210 may be programmed to determine a number of features based on entirety of the respective feature, e.g., a bridge, tree, etc. is counted as one, i.e., a single feature.

As another example, the computer 210 may be programmed to determine first ratio of a first number of detected points in a first map based on a first technique divided by a first minimum number of points for detecting the location based on the first map, and a second ratio of a second number of detected points in a second map based on a second technique divided by a second minimum number of points for detecting the location based on the second map. The computer 210 may be further programmed to select the first localization technique upon determining that the first ratio is greater than the second ratio and to determine the location of the vehicle 180 based on the first map and data received from a vehicle 180 sensor 230.

In one example, each of the map data may include a minimum number of points for detecting a location, e.g., stored in a computer 210 memory. Thus, the computer 210 may be programmed to determine a first minimum number of available point (e.g., cells) in an intensity and occupancy map 400 for a current zone 110A, 110B of the vehicle 180. As discussed above, the computer 210 may be programmed to determine the number of detected points based on the received LIDAR data. In the present context, points may refer to cells, e.g., 10×10 cm squares on the ground surface.

Upon selecting a localization technique, the computer 210 may be programmed to determine the location of the vehicle 180 based on the selected technique. In the present context, the technique of determining the location of the vehicle 180 based on an intensity map is referred to as "intensity mapping", whereas the technique of determining the location of the vehicle 180 based on an occupancy grid map 400 is referred to as "occupancy grid mapping." In the present context, a localization technique includes mathematical techniques to determine the location of the vehicle 180 in accordance with the selected map, e.g., intensity map 300. In other words, the computer 210 may determine the location of the vehicle 180 based on features detected in the received sensor 230 data and data included in the selected map corresponding to the detected features. In one example, the computer 210 may be programmed to identify three or more features in the received sensor 230 data that are included in the selected map data. For example, the computer 210 may be programmed to determine distances between the vehicle 180 to the detected features based on the received sensor 230 data. The computer 210 may be programmed to determine distances between the detected features based on data included in the selected map data. The computer 210 may determine the vehicle 180 location, e.g., using triangulation techniques, based on the distances from the vehicle 180 to the features and the distances between the features.

Additionally, the computer 210 may be programmed to determine an orientation, e.g., pitch, roll, etc., of the vehicle 180 based on the received sensor 230 data and the map data. The pitch and roll may include respective angles of vehicle 180 longitudinal and lateral axes A1, A2 relative to the ground level. The computer 210 may be programmed to store information including an orientation of the sensors 130, e.g., the LIDAR sensor 230, relative to the vehicle 180. Thus, the computer 210 may be programmed to detect an orientation of the features relative to the vehicle 180, e.g., based on a Cartesian two-dimensional coordinate system with a reference point within the vehicle 180.

Processing

Figure 7:
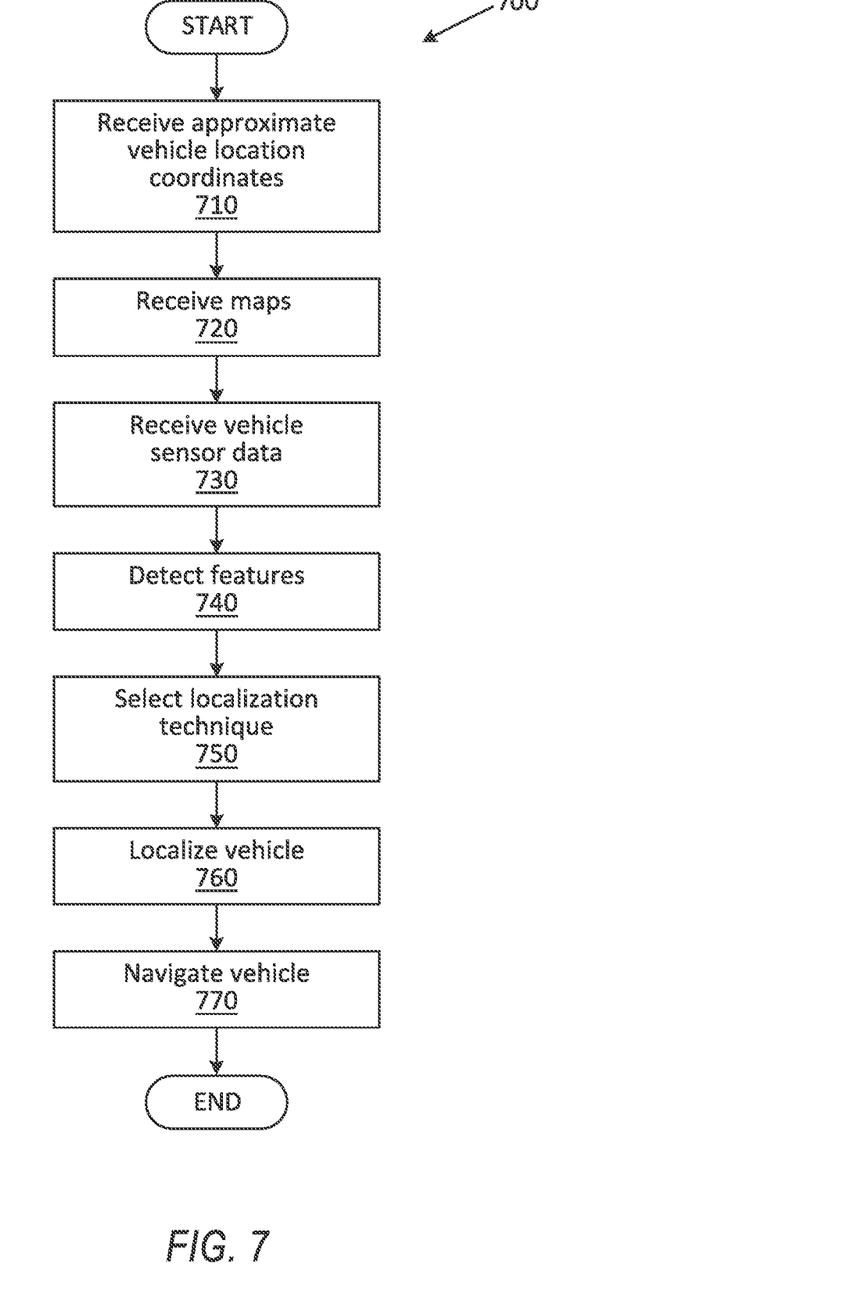
FIG. 7 is a flowchart of an exemplary process for selecting a localization technique and navigating the vehicle.

FIG. 7 is a flowchart of an exemplary process 700 for selecting a localization technique and navigating the vehicle 180. The vehicle 180 computer 210 may be programmed to execute blocks of the process 700.

The process 700 begins in a block 710, in which the computer 210 receives approximate vehicle 180 location coordinates. The computer 210 may be programmed to receive approximate vehicle 180 location coordinates from a vehicle 180 GPS sensor 230, and/or to determine the approximate vehicle 180 location coordinates using dead reckoning technique.

Next, in a block 720, the computer 210 receives map 300, 400 data. The computer 210 may be programmed to received map 300, 400 data associated with an area 100 surrounding the approximate location coordinates of the vehicle 180, e.g., an area 100 with a radius 500 meters around the approximate location coordinates.

Next, in a block 730, the computer 210 receives vehicle 180 sensor 230 data, e.g., LIDAR sensor 230 data.

Next, in a block 740, the computer 210 detects features, e.g., road boundaries 190, structures 170, etc., based on the received LIDAR sensor 230 data.

Next, in a block 750, the computer 210 selects a localization technique based on the data received from vehicle 180 sensor(s) 230 and information available in the maps 300, 400. The computer 210 may be programmed to select a map 300, 400 which has the most number of available features that are also detected in the received sensor 230 data.

Next, in a block 760, the computer 210 localizes the vehicle 180 based on the selected localization technique. The computer 210 may be programmed to localize, i.e., determine location coordinates of, the vehicle 180 based on the detected features in the received LIDAR sensor 230 data and the map 300, 400 associated with the selected localization technique.

Next, in a block 770, the computer 210 navigates the vehicle 180 based on the vehicle 180 location coordinates determined via the vehicle 180 localization. The computer 210 may be programmed to navigate the vehicle 180 by actuating the vehicle 180 propulsion, steering, and/or braking operations.

Following the block 770, the process 700 ends, or alternatively returns to the block 710, although not shown in FIG. 7.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a processor and a memory, the memory storing instructions executable by the processor to:
   determine a selected technique, from a plurality of techniques, to identify a vehicle location by sensor and map data based on features detected in sensor data of an area in which the vehicle is located by:
   determining a first ratio of a first number of available points in a first map based on a first technique from the plurality of techniques divided by a first minimum number of points for detecting the location based on the first map;
   determining a second ratio of a second number of available points in a second map based on a second technique from the plurality of techniques divided by a second minimum number of points for detecting the location based on the second map;
   selecting the first technique as the selected technique upon determining that the first ratio is greater than the second ratio; and
   determining the location of the vehicle based on the first map and data received from a vehicle sensor;
   determine a location of the vehicle based on the selected technique; and
   navigate the vehicle based at least in part on the identified location.

2. The system of claim 1, wherein the instructions include further instructions to determine, for each technique, a ratio of a number of detected features in the area for the respective technique to a number of available features in the map of the area for the respective techniques.

3. The system of claim 2, wherein the instructions include further instructions to select the technique with a highest ratio.

4. The system of claim 2, wherein the available features include detectable edges on a ground surface including a road boundary, a shape, a gradient, a pattern, a building, a bridge, a traffic light, a delineator, and a raised pavement marker.

5. The system of claim 2, wherein the instructions include further instructions to detect the features based on received data from at least one of a vehicle LIDAR sensor and a vehicle camera sensor.

6. The system of claim 1, wherein the plurality of techniques includes an intensity mapping and an occupancy grid mapping.

7. The system of claim 1, wherein the instructions include further instructions to:
   receive data from at least one of a vehicle LIDAR sensor and a vehicle camera sensor;

receive map data according to the selected technique; and
determine the location of the vehicle based on the received map and the received data.

8. The system of claim 1, wherein each of the techniques includes determining the location of the vehicle based on data received from a vehicle sensor and a map of the area.

9. A method, comprising:
determining a selected technique, from a plurality of techniques, to identify a vehicle location by sensor and map data based on features detected in sensor data of an area in which the vehicle is located by:
  determining a first ratio of a first number of available points in a first map based on a first technique from the plurality of techniques divided by a first minimum number of points for detecting the location based on the first map;
  determining a second ratio of a second number of available points in a second map based on a second technique from the plurality of techniques divided by a second minimum number of points for detecting the location based on the second map;
  selecting the first technique as the selected technique upon determining that the first ratio is greater than the second ratio; and
  determining the location of the vehicle based on the first map and data received from a vehicle sensor;
determining a location of the vehicle based on the selected technique; and
navigating the vehicle based at least in part on the identified location.

10. The method of claim 9, further comprising determining, for each technique, a ratio of a number of detected features in the area for the respective technique to a number of available features in the map of the area for the respective techniques.

11. The method of claim 10, further comprising selecting the technique with a highest ratio.

12. The method of claim 10, wherein the available features include detectable edges on a ground surface including a road boundary, a shape, a gradient, a pattern, a building, a bridge, a traffic light, a delineator, and a raised pavement marker.

13. The method of claim 10, further comprising detecting the features based on received data from at least one of a vehicle LIDAR sensor and a vehicle camera sensor.

14. The method of claim 9, wherein the plurality of techniques includes an intensity mapping and an occupancy grid mapping.

15. The method of claim 9, further comprising:
receiving data from at least one of a vehicle LIDAR sensor and a vehicle camera sensor;
receiving map data according to the selected technique; and
determining the location of the vehicle based on the received map and the received data.

16. The method of claim 9, wherein a technique includes determining the location of the vehicle based on data received from a vehicle sensor and a map of the area.

17. A system, comprising:
means for determining a selected technique, from a plurality of techniques, to identify a vehicle location by sensor and map data based on features detected in sensor data of an area in which the vehicle is located including:
  means for determining a first ratio of a first number of available points in a first map based on a first technique from the plurality of techniques divided by a first minimum number of points for detecting the location based on the first map;
  means for determining a second ratio of a second number of available points in a second map based on a second technique from the plurality of techniques divided by a second minimum number of points for detecting the location based on the second map;
  means for selecting the first technique as the selected technique upon determining that the first ratio is greater than the second ratio; and
means for determining the location of the vehicle based on the first map and data received from a vehicle sensor;
means for determining a location of the vehicle based on the selected technique; and
means for navigating the vehicle based at least in part on the identified location.

* * * * *